Patented Jan. 1, 1935

1,986,241

UNITED STATES PATENT OFFICE 1,986,241

PRODUCTION OF VINYL-ARYL COMPOUNDS

Carl Wulff and Ernst Roell, Ludwigshafen-on-the-Rhine, Germany, assignors to I. G. Farbenindustrie Aktiengesellschaft, Frankfort-on-the-Main, Germany No Drawing. Application August 17, 1931, Serial No. 557,729. In Germany September 4, 1930

8 Claims. (Cl. 260—168)

The present invention relates to the production of vinyl-aryl compounds.

In the U. S. application Ser. No. 468,995 filed July 18, 1930, one of the present inventors and another have described a process for the production of styrene and its homologues, according to which alkylated aromatic hydrocarbons which contain at least 2 carbon atoms in the side chain are treated in the vapour phase, if desired in the presence of water vapour or inert gases, such as nitrogen or carbon dioxide, at elevated temperatures, preferably between 500° and 700° C., with dehydrogenating catalysts. As especially active catalysts are specified difficultly reducible metal oxides and compounds, and mixtures thereof; the catalysts employed in the said process may be advantageously subjected to an activating pretreatment with gaseous substances free from carbon, such as water vapour, nitrogen, hydrocarbon or ammonia, at elevated temperatures. The catalysts may also contain small additions, of from about 1 to 3 per cent, of metal compounds which are reducible under the reaction conditions.

We have now found that vinyl-aryl compounds, such as styrene, chlorstyrene and homologues thereof, are also obtained from alkylated aromatic compounds which contain at least 2 carbon atoms in an aliphatic side chain, such as ethyl- or propyl-benzene or -toluene, ethyl-chlorbenzene, di-ethyl benzene, ethyl naphthalene or ethyl diphenyl, by passing the said compounds in the vapour phase at elevated temperatures over catalysts which consist of or contain considerable amounts, i. e. more than 3, such as 5, 10, 20, 50, 70 or 95 per cent by weight, of a metal, the oxide of which is readily reducible by hydrogen to the corresponding metal, and maintaining said metal in a chemical combination containing oxygen during the reaction. This can be effected by employing heat-resistant difficultly reducible compounds of such metals, the oxides of which are readily reducible by hydrogen or, if at least one of the agents water vapour and carbon dioxide be present, metals of the said kind, or their reducible compounds, if desired in conjunction with the said difficultly reducible compounds. Thus, for example, iron phosphate may be employed or iron or iron oxdes, or mixtures thereof with iron phosphates, if steam or carbon dioxide be present which are capable of continuously converting any metallic iron into iron oxides. If desired, the said catalysts may be present in admixture with metal oxides or other difficultly reducible compounds of metals the oxides of which are difficultly reducible by hydrogen. In any case the catalysts must be heat-resistant, i. e. they must not be fused at the temperatures of working.

As catalysts according to the aforesaid definition may be mentioned in particular base metals of the 1st and 8th groups of the periodic system, such as copper and the metals of the iron group, and their oxides and compounds. It is immaterial whether the catalysts are fed into the reaction vessel in the metallic or oxidic form, if water vapour and/or carbon dioxide be present. In such cases copper, cobalt, iron and pure iron from iron carbonyl, or their compounds are excellent catalysts. If, however, no water vapour or carbon dioxide be present, the metals of the iron group and copper and their compounds reducible by hydrogen are not employed. Difficultly reducible compounds of the said metals, (such as of iron, cobalt and copper) as for example their heavy metallates, such as vanadates, molybdates, tungstates or chromates or their borates or phosphates and like heat-resisting and difficultly reducible salts, may be employed, however, even in the absence of water vapour. Nickel and its compounds may lead to a partial decomposition of the initial materials and formation of carbon and should be employed very cautiously or should not be employed at all. In conjunction with the aforesaid catalytic substances compounds of metals the oxides of which are difficultly reducible such as compounds of tin, antimony or bismuth may be employed and those referred to in the application Ser. No. 468,995 as for example metal oxides or metal sulphides, or materials containing the same, such as the oxides of calcium, lithium, strontium, magnesium, beryllium, zirconium, tungsten, chromium, molybdenum, uranium and the like or other difficultly reducible metal compounds, as for example chromium phosphate, calcium aluminate, magnesium chromate, calcium uranate and the like, further anthracite, or deposits of a similar nature occurring in the thermal destruction of gaseous hydrocarbons, active carbon, silica gel, pieces of clay and the like or mixtures of these substances with each other. It is preferable to work in any case with an addition of a foreign gas which prevents the deposition of carbon on the catalysts, such as steam or carbon dioxide. The catalysts may be deposited on carriers in order to increase their activity or pretreated with gases or vapours as described in the said application Ser. No. 468,995.

The dehydrogenation of the said alkylated aromatic compounds and especially of aromatic hydrocarbons is preferably carried out at temperatures between about 500° and about 700° C. For example when preparing styrene from ethyl benzene, from 35 to 50 parts of styrene as well as from 47 to 62 parts of unchanged ethyl benzene and small amounts of products of high boiling point are obtained from 100 parts of ethyl benzene by one passage over the catalyst. The waste gas consists practically of pure hydrogen.

The following examples will further illustrate the nature of this invention, but the invention is not restricted to these examples. The parts are by weight.

Example 1

A mixture of 5 kilograms of ethyl benzene and 5 kilograms of water is passed in the vaporized state during the course of 24 hours over 1 liter of a catalyst which is heated to about 600° C. and consists of 20 parts of copper oxide and 80 parts of Florida earth and which has been pretreated by heating to 600° C. while passing steam thereover. A product consisting to the extent of 50 per cent of styrene is obtained in a yield of 98 per cent. The remaining 50 per cent consists of unchanged ethyl benzene and 1 per cent of condensation products of high boiling point.

Example 2

Ethyl benzene and steam are led at 600° C. in the proportions specified in Example 1 over a catalyst consisting of 40 parts of iron oxide and 60 parts of Florida earth and prepared by soaking Florida earth with iron nitrate and heating the mixture to 600° C. in the presence of steam. The yield of styrene is the same as in Example 1.

Example 3

A catalyst is prepared by impregnating Florida earth with iron chromate so that the catalyst contains 20 per cent by weight of iron chromate. A mixture of ethyl benzene and nitrogen is led over the catalyst at 600° C. in such a manner that 5 kilograms of ethyl benzene and 5 cubic meters of nitrogen flow over each liter of catalyst in 24 hours. The yield of styrene is the same as specified in Example 1.

Other suitable catalysts are for example mixtures of zinc phosphate and cobalt phosphate in any proportion or, preferably, in a ratio of say 3 to 1, mixtures of iron vanadate and magnesium oxide in any proportion or, preferably, in a ratio of say 5 to 1, Florida earth impregnated with ammonium ferrocyanide, which is convertible in iron carbide, and the like. Yields of styrene as specified in Example 1 are obtained with these catalysts. Similarly active silica impregnated with iron oxide may be employed if the nitrogen be replaced by steam or carbon dioxide.

Other alkylated aromatic hydrocarbons may be employed instead of ethyl benzene. For example ethyl toluene furnishes good yields of methyl styrene, ethyl chlorbenzene forms chlorstyrene, isopropyl benzene forms mainly alpha-methyl styrene together with a little styrene and unchanged isopropyl benzene and from diethyl benzene mixtures of styrenes may also be obtained in this way.

Example 4

Ethyl chlorbenzene obtainable by acting with ethylene on chlorbenzene in the presence of aluminium chloride and consequently constituting a mixture of the isomers, is passed at 600° C. together with an equal quantity of water over a catalyst consisting of 50 parts each of zinc oxide and of copper oxide at a velocity corresponding to that described in Example 1. Chlorstyrene is obtained in a yield which is about the same as described in Example 1 with reference to styrene.

What we claim is:

1. In the catalytic production of vinyl-aryl compounds by contacting vapors of a substance selected from the group consisting of alkylated aromatic hydrocarbons, containing at least 2 carbon atoms in an aliphatic side chain and halogen derivatives of said hydrocarbons, with dehydrogenating catalysts, while heating to from about 500° to about 700° C., the step which comprises contacting said vapors with a dehydrogenating catalyst essentially containing more than 3 per cent of its weight of a metal, the oxides of which are readily reducible by hydrogen to the corresponding metal, supported on a carrier, and maintaining said metal in a heat-resistant chemical oxygen-containing combination during the reaction.

2. In the catalytic production of vinyl-aryl compounds by contacting vapors of a substance selected from the group consisting of alkylated aromatic hydrocarbons, containing at least 2 carbon atoms in an aliphatic side chain and halogen derivatives of said hydrocarbons, with dehydrogenating catalysts, while heating to from about 500° to about 700° C., the step which comprises passing said vapors through a reaction vessel fed with a dehydrogenating catalyst essentially containing more than 3 per cent of its weight of a heat-resistant, difficultly reducible, oxygen-containing compound of a metal the oxides of which are readily reducible by hydrogen to the corresponding metal.

3. In the catalytic production of vinyl-aryl compounds by contacting vapors of a substance selected from the group consisting of alkylated aromatic hydrocarbons, containing at least 2 carbon atoms in an aliphatic side chain and halogen derivatives of said hydrocarbons, with dehydrogenating catalysts, while heating to from about 500° to about 700° C., the step which comprises contacting said vapors with a dehydrogenating catalyst essentially containing more than 3 per cent of its weight of a heat-resistant, oxygen-containing compound of a metal, readily reducible by hydrogen, supported on a carrier, and in the presence of at least one of the agents water vapor and carbon dioxide.

4. In the catalytic production of vinyl-aryl compounds by contacting vapors of a substance selected from the group consisting of alkylated aromatic hydrocarbons, containing at least 2 carbon atoms in an aliphatic side chain and halogen derivatives of said hydrocarbons, with dehydrogenating catalysts, while heating to from about 500° to about 700° C., the step which comprises contacting said vapors with a dehydrogenating catalyst essentially containing more than 3 per cent of its weight of a metal selected from the group consisting of copper, cobalt and iron, supported on a carrier, and maintaining said metal in a heat-resistant oxygen-containing chemical combination during the reaction.

5. In the catalytic production of vinyl-aryl compounds by contacting vapors of a substance selected from the group consisting of alkylated aromatic hydrocarbons, containing at least 2 carbon atoms in an aliphatic side chain and halogen derivatives of said hydrocarbons, with dehydrogenating catalysts, while heating to from about 500° to about 700° C., the step which comprises passing said vapors through a reaction vessel fed with a dehydrogenating catalyst essentially containing more than 3 per cent of its weight of a heat-resistant, difficultly reducible, oxygen-containing salt of a metal selected from the group consisting of copper, cobalt and iron.

6. In the catalytic production of vinyl-aryl compounds by contacting vapors of a substance selected from the group consisting of alkylated aromatic hydrocarbons, containing at least 2 carbon atoms in an aliphatic side chain and halogen derivatives of said hydrocarbons, with dehydrogenating catalysts while heating to from about 500° to 700° C., the step which comprises passing said vapors through a reaction vessel fed with a dehydrogenating catalyst essentially containing more than 3 per cent of its weight of a heavy metallate of a metal selected from the group consisting of copper, cobalt and iron.

7. In the catalytic production of vinyl-aryl compounds by contacting vapors of a substance selected from the group consisting of alkylated aromatic hydrocarbons, containing at least 2 carbon atoms in an aliphatic side chain and halogen derivatives of said hydrocarbons, with dehydrogenating catalysts, while heating to from about 500° to 700° C., the step which comprises passing said vapors through a reaction vessel fed with a dehydrogenating catalyst essentially containing more than 3 per cent of its weight of a heat-resistant phosphate of a metal selected from the group consisting of copper, cobalt and iron.

8. In the catalytic production of vinyl-aryl compounds by contacting vapors of a substance selected from the group consisting of alkylated aromatic hydrocarbons, containing at least 2 carbon atoms in an aliphatic side chain and halogen derivatives of said hydrocarbons, with dehydrogenating catalysts, while heating to from about 500° to 700° C., the step which comprises passing said vapors through a reaction vessel fed with a dehydrogenating catalyst essentially containing a compound of a metal, the oxides of which are difficultly reducible by hydrogen, and more than 3 per cent, by weight of the catalyst, of a metal, the oxides of which are readily reducible by hydrogen to the corresponding metal, and maintaining said metal in a heat-resistant oxygen-containing chemical combination containing oxygen during the reaction.

CARL WULFF.
ERNST ROELL.